(12) United States Patent
Yoon et al.

(10) Patent No.: US 8,054,608 B2
(45) Date of Patent: Nov. 8, 2011

(54) MLCC MODULE

(75) Inventors: Jung Rag Yoon, Gyeonggi-do (KR);
Kyung Min Lee, Gyeonggi-do (KR);
Bong Wha Moon, Gyeonggi-do (KR);
Sang Won Lee, Gyeonggi-do (KR); Min Kee Kim, Gyeonggi-do (KR)

(73) Assignee: Samhwa Capacitor Co., Ltd., Kyongki-do (KR)

( * ) Notice: Subject to any disclaimer, the term of this patent is extended or adjusted under 35 U.S.C. 154(b) by 722 days.

(21) Appl. No.: 12/230,189

(22) Filed: Aug. 26, 2008

(65) Prior Publication Data

US 2010/0020467 A1    Jan. 28, 2010

(30) Foreign Application Priority Data

Jul. 23, 2008 (KR) .................... 10-2008-0071666

(51) Int. Cl.
*H01G 4/06* (2006.01)
(52) U.S. Cl. .................. 361/321.4; 361/305; 361/311; 361/313; 361/321.2; 361/306.3
(58) Field of Classification Search ............. 361/321.2, 361/321.1, 321.4, 311–313, 301.4, 301.2, 361/306.1, 306.3, 305, 303
See application file for complete search history.

(56) References Cited

U.S. PATENT DOCUMENTS

| 4,424,615 | A | | 1/1984 | Wakino |
| 5,963,416 | A | * | 10/1999 | Honda et al. ............... 361/306.1 |
| 6,252,761 | B1 | * | 6/2001 | Branchevsky ............. 361/321.2 |
| 6,570,774 | B1 | * | 5/2003 | Moriwaki et al. ............ 361/760 |
| 6,985,349 | B2 | * | 1/2006 | Smyth et al. .................. 361/312 |
| 7,054,136 | B2 | * | 5/2006 | Ritter et al. ................... 361/309 |
| 7,430,107 | B2 | * | 9/2008 | Fukudome et al. ........ 361/306.3 |
| 7,450,395 | B2 | * | 11/2008 | Sakai ............................ 361/760 |

* cited by examiner

*Primary Examiner* — Nguyen T Ha
(74) *Attorney, Agent, or Firm* — Rosenberg, Klein & Lee (57) ABSTRACT

Provided is a MLCC module used as a direct current (DC) link capacitor that is included in an inverter of a hybrid vehicle. The MLCC module includes: a plurality of first ceramic sheets 10, each including a plurality of first internal electrode portions 20; a plurality of second ceramic sheets 30, each being disposed between the plurality of first ceramic sheets 10 respectively to include a plurality of second internal electrode portions 40; a plurality of external electrode portions 50 being connected to the plurality of first internal electrode portions 20, respectively; a plurality of clamp lead electrode portions 60 being connected to the plurality of external electrode portions 50 to input and output electrical signals, respectively; and an epoxy molding compound (EMC) molding member sealing the plurality of first ceramic sheets 10, the plurality of second ceramic sheets 30, and the plurality of external electrode portions 50 to expose one ends of the plurality of clamp lead electrode portions 50, respectively.

15 Claims, 6 Drawing Sheets

MLCC MODULE

BACKGROUND

1. Field

The present invention relates to a MLCC module, and more particularly, to a MLCC(multi layer ceramic capacitor) module used as a direct current (DC) link capacitor that is included in an inverter of a hybrid vehicle.

2. Background

A hybrid vehicle is driven by an engine and a power of a battery. A force distribution apparatus of the hybrid vehicle includes a fuel battery, a motor, an inverter, a motor control unit (MCU), and a direct current (DC)-to-DC (DC/DC) converter.

The fuel battery generates electricity, and the motor is driven by the force of the generated electricity. The MCU controls the inverter with a pulse width modulation (PWM). The DC/DC converter converts the power generated in the fuel battery to supply the converted power as power of various types of electric field loads. The inverter switches DC voltage output from the fuel battery according to control of the MCU to convert the DC voltage to three-phase alternative current (AC) and supply the same as drive power of the motor.

A DC link capacitor is applied to the inverter that supplies the drive power to the motor. A MLCC (multi layer ceramic capacitor) module may be applied as the conventional DC link capacitor. The conventional MLCC module uses a plurality of aluminum electrolytic capacitors.

The above references are incorporated by reference herein where appropriate for appropriate teachings of additional or alternative details, features and/or technical background.

When a plurality of aluminum electrolytic capacitors is used as a conventional MLCC module, electrolyte is used and thus unique resistance is high, decreasing equivalent series resistance (ESR) characteristic and insulation resistance (IR) characteristic. Since the IR characteristic is decreased, impedance characteristic is also deteriorated.

The present invention is conceived to solve the above-described problems and thus an aspect of the present invention provides a MLCC module that can use, as a dielectric substance, ceramic with a high dielectric constant and thereby can enhance the high capacity regardless of a small size and also can obtain low ESR characteristic and low IR characteristic and also can improve heat-dissipation characteristic.

Another aspect of the present invention also provides a MLCC module that can extend the horizontal length of a MLCC module with respect to the vertical length thereof and thereby can improve ESL characteristic.

According to an aspect of the present invention, there is provided a MLCC module including: a plurality of first ceramic sheets, each including a plurality of first internal electrode portions; a plurality of second ceramic sheets, each being disposed between the plurality of first ceramic sheets respectively to include a plurality of second internal electrode portions; a plurality of external electrode portions being connected to the plurality of first internal electrode portions, respectively; a plurality of clamp lead electrode portions being connected to the plurality of external electrode portions to input and output electrical signals, respectively; and an epoxy molding compound (EMC) molding member sealing the plurality of first ceramic sheets, the plurality of second ceramic sheets, and the plurality of external electrode portions to expose one ends of the plurality of clamp lead electrode portions, respectively.

BRIEF DESCRIPTION OF THE DRAWINGS

The embodiments will be described in detail with reference to the following drawings in which like reference numerals refer to like elements wherein.

DETAILED DESCRIPTION

Hereinafter, a MLCC module according to the present invention will be described with reference to the accompanying drawings.

Figure 1:
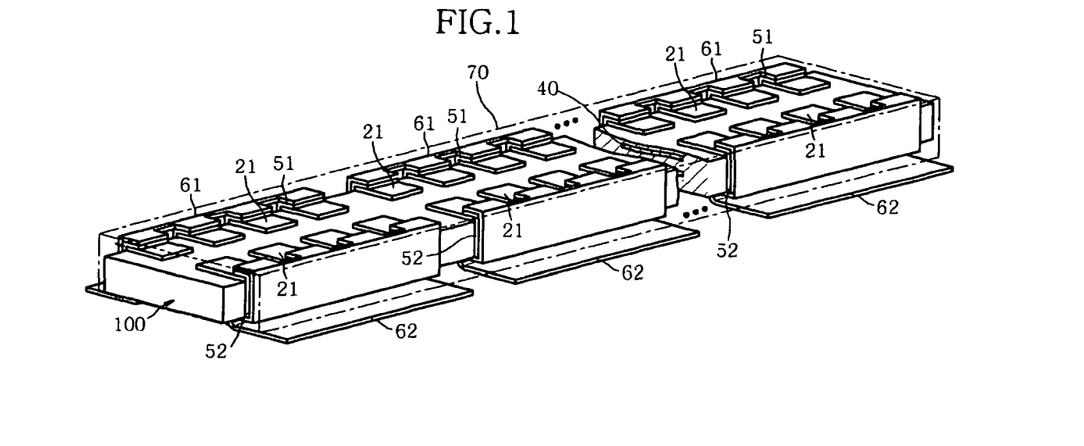
FIG. 1 is a perspective view of a MLCC module according to the present invention.
Figure 2:
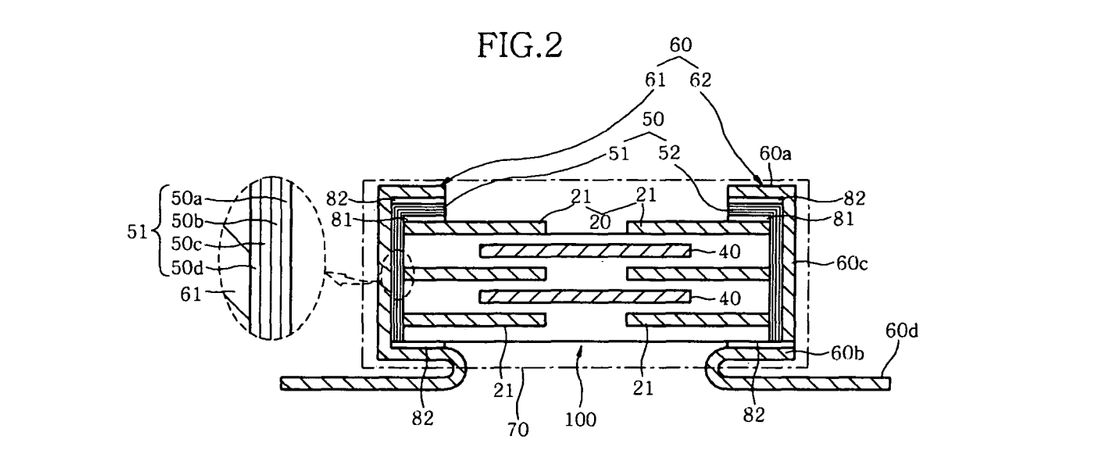
FIG. 2 is a cross-sectional side view of the MLCC module shown in FIG. 1.
Figure 3:
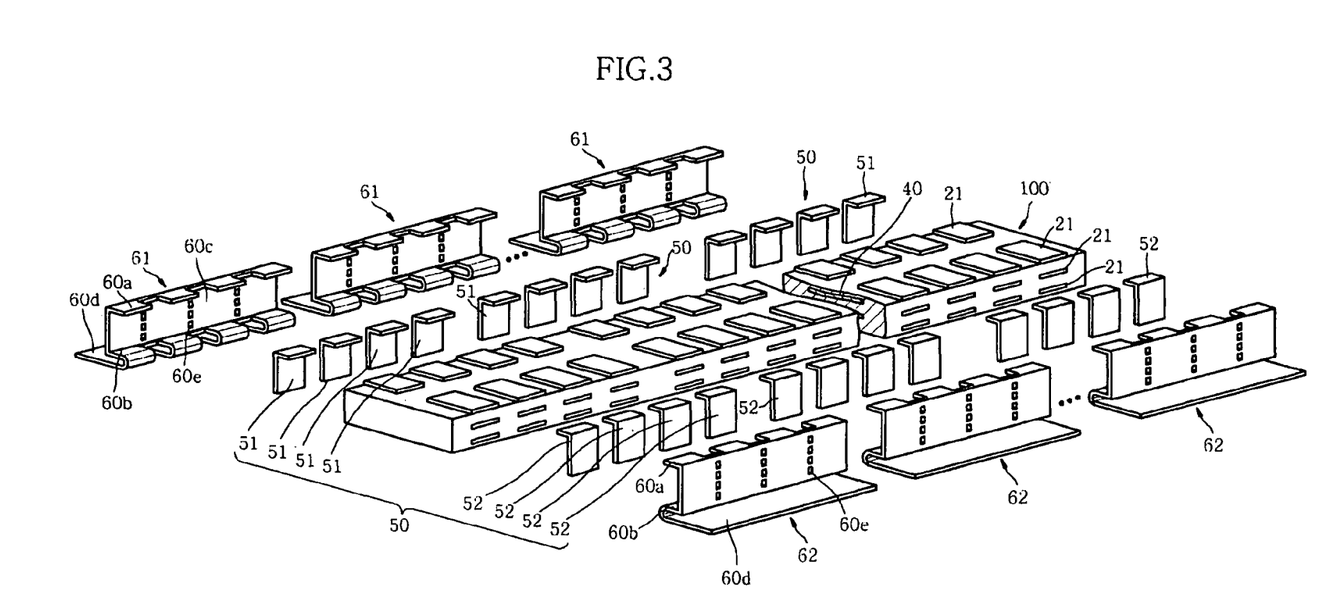
FIG. 3 is an exploded perspective view of the MLCC module shown in FIG. 1.
Figure 4:
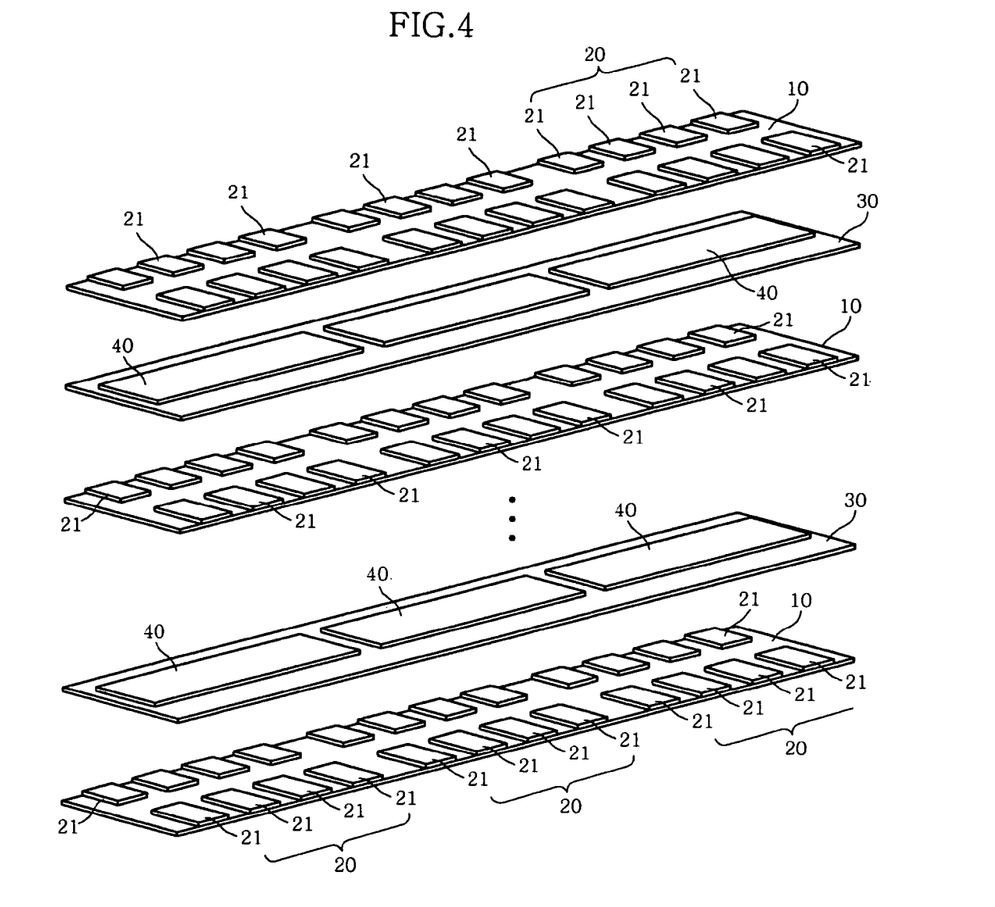
FIG. 4 is an exploded perspective view of a ceramic sheet multi-layer body shown in FIG. 3.

FIG. 1 is a perspective view of a MLCC module according to the present invention, FIG. 2 is a cross-sectional side view of the MLCC module shown in FIG. 1, FIG. 3 is an exploded perspective view of the MLCC module shown in FIG. 1, and FIG. 4 is an exploded perspective view of a ceramic sheet multi-layer body shown in FIG. 3.

As shown in FIGS. 1 through 4, the MLCC module includes a plurality of first ceramic sheets 10, a plurality of second ceramic sheets 30, a plurality of external electrode portions 50, a plurality of clamp lead electrode portions 60, and an epoxy molding compound (EMC) molding member 70.

Each of the plurality of first ceramic sheets 10 is arranged with a plurality of first internal electrode portions 20. Each of the plurality of first internal electrode portions 20 includes short type internal electrodes 21 that are arranged to be n×m electrodes with respect to horizontal direction (X-axis direction: see FIG. 5a)×vertical direction (Y-axis direction: see FIG. 5a). Each of the plurality of first internal electrode portions 20 includes the short type internal electrodes that are arranged to be at least 4×2 electrodes with respect to horizontal direction×vertical direction.

Figure 5A:
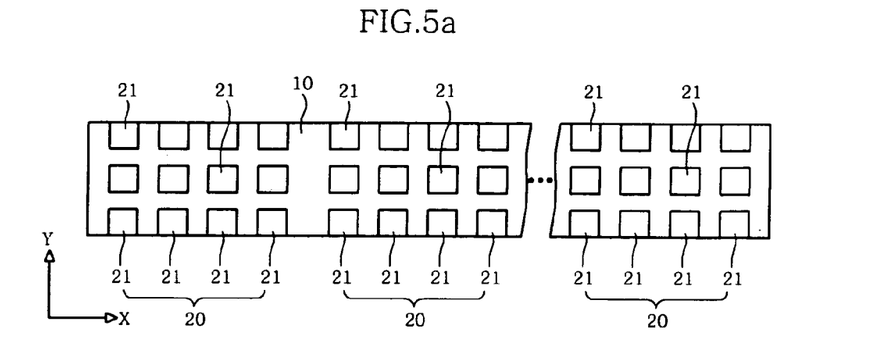
FIGS. 5a through 5c are top views illustrating another embodiment of a first internal electrode shown in FIG. 4.
Figure 5B:
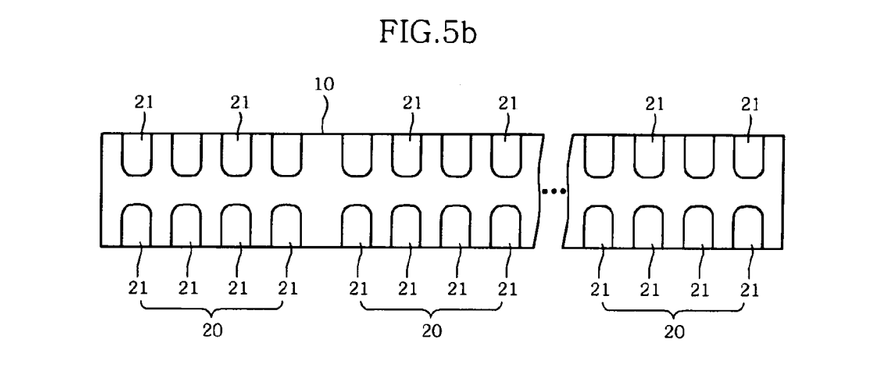
Figure 5C:
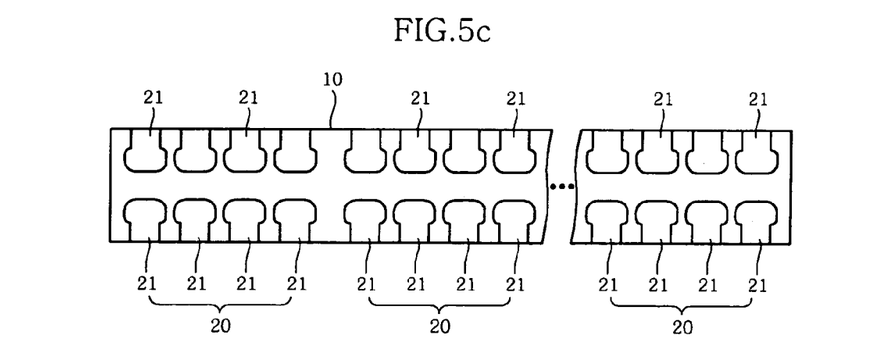

For example, as shown in FIG. 4, 4×2 short type internal electrodes 21 may be arranged on a single first internal electrode portion 20 with respect to horizontal direction×vertical direction. Also, as shown in FIG. 5a, 4×3 short type internal electrodes 21 may be arranged on a single first internal electrode portion 20 with respect to horizontal direction×vertical direction. A pattern of the short type internal electrode 21 may adopt any one of a square pattern as shown in FIG. 5a, a finger pattern as shown 5b, and an edge-removed protrusion pattern as shown in FIG. 5c. The edge-removed protrusion pattern is constructed to integrally form an extension pattern (reference numeral not shown) with an edge-removed square pattern (reference numeral not shown).

Each of the plurality of second ceramic sheets 30 is disposed between the plurality of first ceramic sheets 10. A plurality of second internal electrode portions 40 is formed on each of the plurality of second ceramic sheets 30. Each of the plurality of second internal electrode portions 40 includes P long type internal electrodes 41 that are arranged in the vertical direction (Y-axis direction: see FIG. 6a). Each of the plurality of second internal electrode portions 40 includes a plurality of long type internal electrodes 41 that are arranged to be at least one electrode in the vertical direction.

When m short type internal electrodes 21 are arranged in the vertical direction, m−1=p number of long type internal electrodes 41 are arranged in the vertical direction. Specifically, a number of long type internal electrodes 41 less than a number of short type internal electrodes 21 by one are formed on the second ceramic sheet 30. A pattern of the long type internal electrode 41 may adopt any one of a square pattern as shown in FIG. 6a, an edge-removed square pattern as shown in FIG. 6b, and an elliptical pattern as shown in FIG. 6c.

As described above, a ceramic sheet multi-layer body 100 is formed by providing, in turn, the plurality of first ceramic sheets 10, each including the plurality of first internal electrode portions 20, and the plurality of second ceramic sheets 30, each including the plurality of second internal electrode portions 40. The horizontal length of the ceramic sheet multi-layer body 100 is greater than the vertical length thereof. As described above, when the horizontal length of the ceramic sheet multi-layer body 100 is greater than the vertical length thereof, it is possible to improve ESL characteristic. Also, it is possible to improve heat dissipation characteristic by increasing surface area.

Also, the first ceramic sheet 10 or the second ceramic sheet 30 is positioned between the short type internal electrode 21 and the long type internal electrode 41. Therefore, although a ceramic material is applied as a dielectric substance and it is a small size, it is possible to have the high capacity. When using a pattern where edge is removed from the short type internal electrode 21 or the long type internal electrode 41, it is possible to uniformly distribute electric field. Also, it is possible to increase an electric field applying area by forming the long type internal electrode 41 in a single long pattern.

Figure 6A:
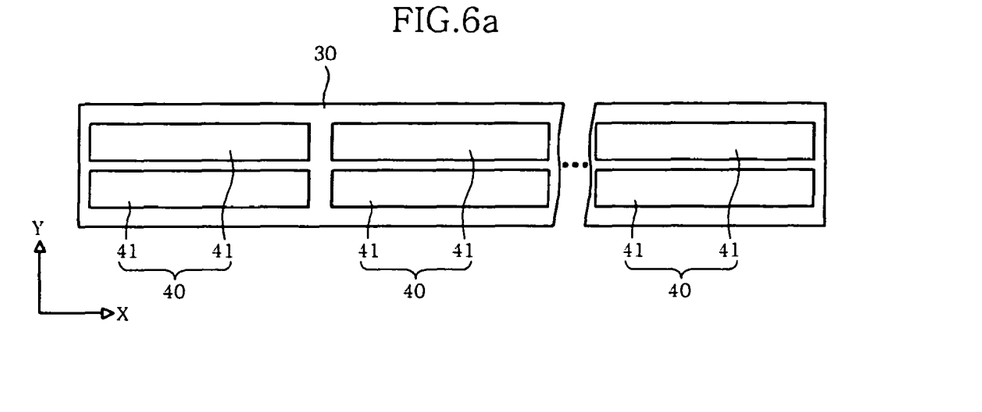
FIGS. 6a through 6c are top views illustrating another embodiment of a second internal electrode shown in FIG. 4.
Figure 6B:
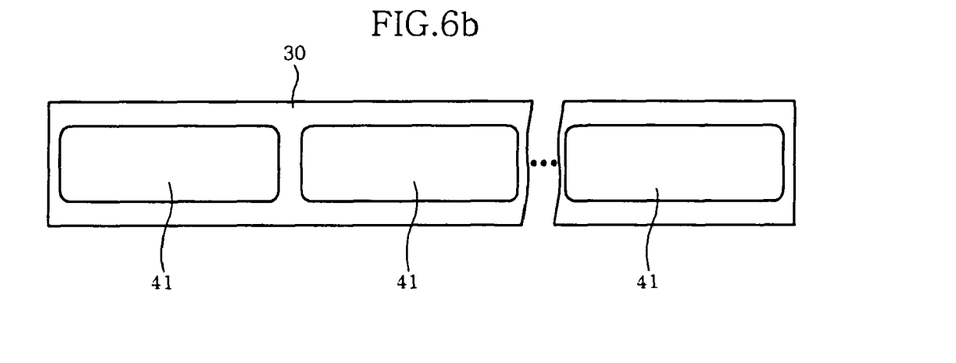
Figure 6C:
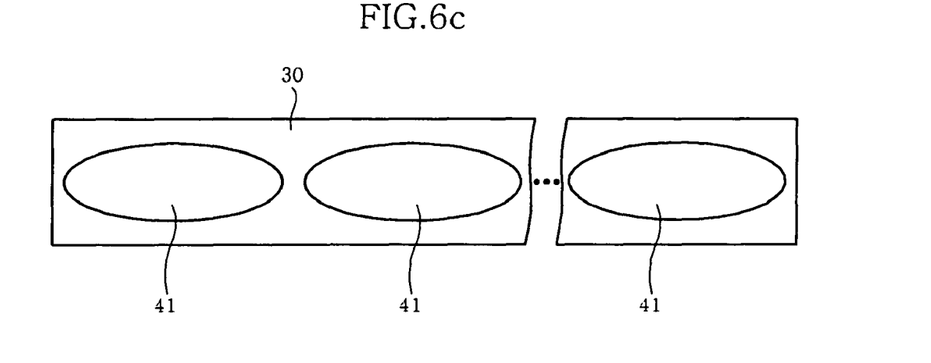

For example, when 4×2 short type internal electrodes 21 are arranged with respect to horizontal direction×vertical direction as shown in FIG. 4, a plurality of capacitors may be constructed to overlap the single long type internal electrode 41 as shown in FIG. 6a. Through this, it is possible to improve the uneven distribution of electric field caused by edge that may occur when dividing the internal electrode based on a number of horizontal directions of the short type internal electrode 21. Since the surface area is increased, it is possible to increase the electric field applying area.

A plurality of external electrode portions 50 is connected to the plurality of first internal electrode portions 20, respectively. Each of the plurality of external electrode portions 50 includes n first external electrodes 51 and n second external electrodes 52.

As shown in FIG. 3, when n short type internal electrodes 21 are firstly arranged in the vertical direction, n first external electrodes 51 are provided to be connected to the n short type internal electrodes respectively. When n short type internal electrodes are arranged in an $m^{th}$ order in the vertical direction, n second external electrodes 52 are provided to be connected to the n short type internal electrodes 21, respectively. As shown in FIG. 2, each of the first external electrode 51 and the second external electrode 52 further includes a conductive adhesive member 81 so as to improve adhesiveness with the short type internal electrode 20. The conductive adhesive member 81 may use solder paste, conductive epoxy, and the like.

As shown in FIG. 2, each of the first external electrode 51 and the second external electrode 52 includes a tin (Sn) electrode member 50a, a nickel (Ni) electrode member 50b, a silver (Ag) epoxy member 50c, and a copper (Cu) electrode member 50d.

The Sn electrode member 50a is formed on the short type internal electrode 21 to enable the Ni electrode member 50b to be readily attached to the short type internal electrode 21 using adhesiveness. The Ni electrode member 50b is formed on the Sn electrode member 50a. The Sg epoxy member 50c is formed on the Ni electrode member 50b to provide adhesiveness like the Sn electrode member 50a. The Cu electrode member 50d is formed on the Ag epoxy member 50c to be formed above the Ni electrode member 50b by adhesiveness of the Ag epoxy member 50c. The Cu electrode member 50d prevents the first external electrode 51 and the second external electrode 52 from reacting with the outside air and thereby being oxidized.

The plurality of clamp lead electrode portions 60 is connected to the plurality of external electrode portions 50 respectively to input and output electrical signals. Each of the plurality of clamp lead electrode portions 60 includes a first clamp lead electrode 61 and a second clamp lead electrode 62. The first clamp lead electrode 61 is connected to n first external electrodes 51 and the second clamp lead electrode 62 is connected to n second external electrodes 52 to thereby input and output electrical signals. The electrical signals are input into an inverter circuit (not shown) of the hybrid vehicle and are output from the inverter circuit. The plurality of clamp lead electrode portions 60 inputting and outputting the electrical signals may use a metal material to thereby obtain low ESR characteristic and low IR characteristic.

The EMC molding member 70 seals the plurality of first ceramic sheets 10, the plurality of second ceramic sheets 30, and the plurality of external electrode portions 50 to expose one ends of the plurality of clamp lead electrode portions 60.

Hereinafter, the first clamp lead electrode 61 and the second clamp lead electrode 62 sealed by the EMC molding member 70 to expose its one end will be described in detail with reference to FIGS. 2, 3, 7a, and 7b.

Figure 7A:
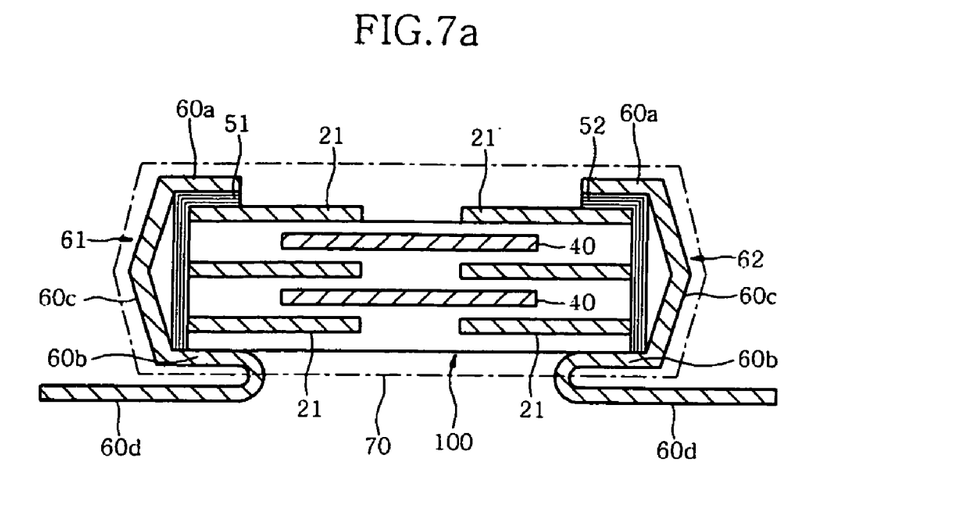
FIGS. 7a and 7b are cross-sectional side views of a MLCC module showing another embodiment of a clamp lead electrode portion shown in FIG. 1.
Figure 7B:
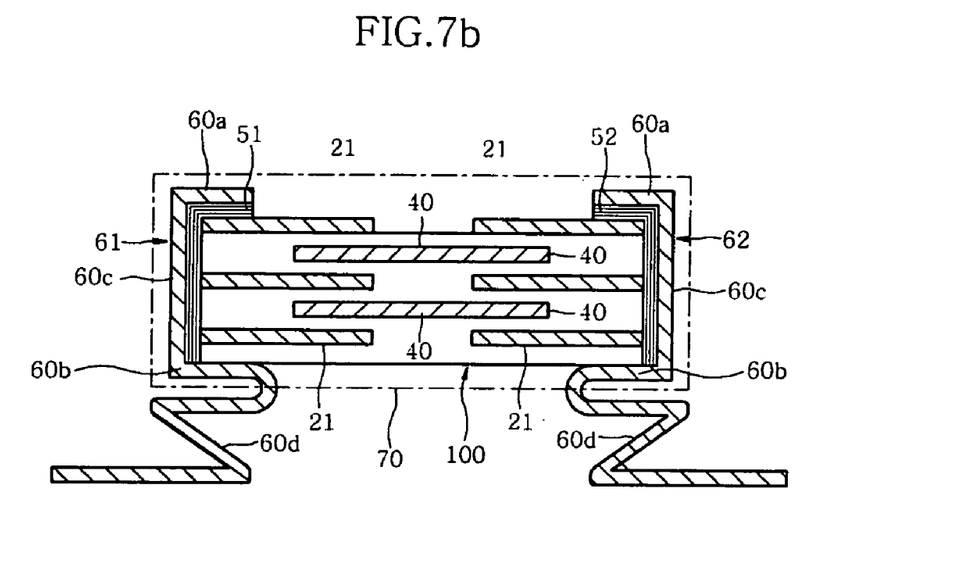

As shown in FIGS. 7a and 7b, each of the first clamp lead electrode 61 and the second clamp lead electrode 62 includes n first insertion members 60a, n second insertion members 60b, a connection insertion member 60c, and a lead plate member 60d.

The n first insertion members 60a are inserted into second ceramic sheets 30, which are positioned in a vertical upper portion among the plurality of second ceramic sheets, to be connected to the first clamp lead electrode 61 connecting with the n short type internal electrodes 21 that is firstly arranged in the vertical direction, or connected to the n short type internal electrodes 21 that are arranged in the $m^{th}$ in the vertical direction.

The n second insertion members 60b are inserted into second ceramic sheets 30, which are positioned in a vertical upper portion among the plurality of second ceramic sheets, to be connected to the first clamp lead electrode 61 connecting with the n short type internal electrodes 21 that is firstly arranged in the vertical direction, or connected to the n short type internal electrodes 21 that are arranged in the $m^{th}$ in the vertical direction. As shown in FIG. 2, each of the first insertion member 60a and the second insertion member 60b further includes a conductive adhesive member 82 in order to improve adhesiveness with one ends or another ends of the n first external electrodes 51 or the n second external electrodes 52. The conductive adhesive member 82 may use solder paste, conductive epoxy, and the like.

The connection insertion member 60c is formed to extend the n first insertion members 60a and the n second insertion members 60b. The connection insertion member 60c is inserted into second ceramic sheets 30, excluding second ceramic sheets 30 positioned in a upper portion and a lower portion among the plurality of second ceramic sheets 30, to be connected to the first clamp lead electrode 61 connecting with the n short type internal electrodes 21 that are firstly arranged in the vertical direction, or connected to the n short type internal electrodes 21 that are arranged in the $m^{th}$ in the vertical direction. As another example of the connection insertion member 60c, referring to FIG. 7a, the connection insertion member is curved to make the n first insertion members 60a and the n second insertion members 60b contact with one end or another end of each of the n first external electrodes 51 or the n second external electrodes by elasticity. Specifically, the connection insertion member 60c provides elasticity to each of the first insertion member 60a and the second insertion member 60b by bending a middle portion of the connection insertion member 60c. Also, as shown in FIG. 3, a plurality of curved grooves 60c are formed on the connection insertion member 60c. The plurality of curved grooves 60e may prevent distortion of bending that may occur by using a metal material for the connection insertion member 60c.

The lead plate member 60d is extended from the n second insertion members 60 to be soldered on a circuit substrate (not shown) of the inverter of the hybrid vehicle so as to receive or output electrical signals. As another example of the lead plate member 60d, as shown in FIG. 7b, the lead plate member 60d is formed in a Z shape. The Z-shaped lead plate member 60d may buffer impact when the impact occurs in a vehicle and thereby prevent the inverter of the vehicle adopting the MLCC module of the present invention from being damaged.

According to the present invention, a MLCC module may use, as a dielectric substance, ceramic with a high dielectric constant and thereby have high capacity regardless of its small size and may also use metal for material of an electrode to thereby obtain low equivalent series resistance (ESR) characteristic and low insulation resistance (IR) characteristic and may increase surface area to thereby improve heat dissipation characteristic.

Also, according to the present invention, a MLCC module may extend the length of the MLCC module in comparison to the width thereof to thereby improve ESL characteristic and may also decrease the edge of an internal electrode to thereby uniform an electric field distribution and improve an electric field applying area.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A MLCC module comprising:
a plurality of first ceramic sheets, each including a plurality of first internal electrode portions;
a plurality of second ceramic sheets, each being disposed between the plurality of first ceramic sheets respectively to include a plurality of second internal electrode portions;
a plurality of external electrode portions being connected to the plurality of first internal electrode portions, respectively;
a plurality of clamp lead electrode portions being connected to the plurality of external electrode portions to input and output electrical signals, respectively; and
an epoxy molding compound (EMC) molding member sealing the plurality of first ceramic sheets, the plurality of second ceramic sheets, and the plurality of external electrode portions to expose one ends of the plurality of clamp lead electrode portions, respectively.

2. The MLCC module of claim 1, wherein each of the plurality of first internal electrode portions includes short type internal electrodes that are arranged to be n×m internal electrodes with respect to horizontal direction×vertical direction.

3. The MLCC module of claim 1, wherein each of the plurality of external electrode portions comprises:
n first external electrodes being connected to n short type internal electrodes that are firstly arranged in the vertical direction, respectively; and
n second external electrodes being connected to n short type internal electrodes that are arranged in the vertical direction in an $m^{th}$ order,
wherein each of the n first external electrodes and the n second external electrodes comprises a tin electrode member being formed in the short type internal electrode, a nickel electrode member being formed on the tin electrode member, a silver epoxy member being formed on the nickel electrode member to provide adhesiveness, and a cupper electrode member being formed on the silver epoxy layer.

4. A MLCC module comprising:
a plurality of first ceramic sheets, each including a plurality of first internal electrode portions;
a plurality of second ceramic sheets, each being disposed between the plurality of first ceramic sheets respectively to include a plurality of second internal electrode portions;
a plurality of external electrode portions being connected to the plurality of first internal electrode portions, respectively;
a plurality of clamp lead electrode portions being connected to the plurality of external electrode portions to input and output electrical signals, respectively; and
an EMC molding member sealing the plurality of first ceramic sheets, the plurality of second ceramic sheets, and the plurality of external electrode portions to expose one ends of the plurality of clamp lead electrode portions, respectively,
wherein each of the plurality of first internal electrode portions includes short type internal electrodes that are arranged to be n×m internal electrodes with respect to horizontal direction×vertical direction, each of the plurality of second internal electrode portions includes p long type internal electrodes that are arranged in the vertical direction, each of the plurality of external electrode portions comprises n first external electrodes being connected to n short type internal electrodes that are firstly arranged in the vertical direction, respectively, and n second external electrodes being connected to n short type internal electrodes that are arranged in the vertical direction in an $m^{th}$ order, and each of the plurality of clamp lead electrode portions comprises a first clamp lead electrode being connected to n first external electrodes and a second clamp lead electrode being connected to n second external electrodes.

5. The MLCC module of claim 4, wherein each of the plurality of first internal electrode portions includes short type internal electrodes that are arranged to be at least 4×2 internal electrodes with respect to horizontal direction×vertical direction.

6. The MLCC module of claim 4, wherein each of the plurality of second internal electrode portions comprises at least one long type internal electrode that is arranged in the vertical direction, and m−1=p number of long type internal electrodes are arranged in the vertical direction when m short type internal electrodes are arranged in the vertical direction.

7. The MLCC module of claim 4, wherein a pattern of the short type internal electrodes adopts any one of a square pattern, a finger pattern, and an edge-removed protrusion pattern.

8. The MLCC module of claim 4, wherein a pattern of the long type internal electrode adopts any one of a square pattern, an edge-removed square pattern, and an elliptical pattern.

9. The MLCC module of claim 4, wherein each of the n first external electrodes and the n second external electrodes further includes a conductive adhesive member in an interval with the short type internal electrodes.

10. The MLCC module of claim 4, wherein each of the n first external electrodes and the n second external electrodes comprises:

a tin electrode member being formed on the short type internal electrode;

a nickel electrode member being formed on the tin electrode member;

a silver epoxy member being formed on the nickel electrode member to provide adhesiveness; and a cupper electrode member being formed on the silver epoxy member.

11. The MLCC module of claim 4, wherein each of the plurality of first clamp lead electrodes and the plurality of second clamp lead electrodes comprises:

n first insertion members being inserted into one ends of the n first external electrodes or the n second external electrodes to thereby be connected thereto, respectively;

n second insertion members being inserted into another ends of the n first external electrodes or the n second external electrodes to thereby be connected thereto, respectively;

an connection insertion member being formed between the n first insertion members and the n second insertion members; and a lead plate member being extended from the n second insertion members.

12. The MLCC module of claim 11, wherein each of the first insertion member and the second insertion member further a conductive adhesive member in order to improve the adhesiveness with one ends or another ends of the n first external electrodes or the n second external electrodes.

13. The MLCC module of claim 11, wherein the connection insertion member is curved to make the n first insertion members and the n second insertion members contact with one ends or another ends of the n first external electrode or the n second external electrodes by elasticity.

14. The MLCC module of claim 11, wherein the connection insertion member is formed with a plurality of curved grooves.

15. The MLCC module of claim 11, wherein the lead plate member is formed in a Z shape.

* * * * *